United States Patent Office
3,549,377
Patented Dec. 22, 1970

1

3,549,377
METHOD OF HARDENING PHOTOGRAPHIC GEL-
ATIN-CONTAINING LAYERS WITH NON-IONIC
DICHLOROTRIAZINYL AMINO COMPOUNDS
Heinz Meckl, Wolfgang Himmelmann, and Franz Moll,
Cologne, Germany (all % Agfa-Gevaert Aktiengesell-
schaft, Leverkusen, Germany), and Hans-Ludwig Honig
and Erwin-Alfons Muller, both % Farbenfabriken
Bayer Aktiengesellschaft, Leverkusen, Germany
No Drawing. Filed May 15, 1967, Ser. No. 638,626
Claims priority, application Germany, May 13, 1966,
1,522,378
Int. Cl. G03c 1/30
U.S. Cl. 96—111                              6 Claims

ABSTRACT OF THE DISCLOSURE

Hardening of gelatin, especially in coatings and layers employed in photographic light-sensitive materials, by incorporating therein—preferably before pouring or coating—a non-ionic dichlorotriazinyl amino compound containing hydroxyl, ether and/or ester groups.

---

The present invention relates to a method of hardening gelatin-containing photographic coatings by means of dichlorotriazinyl amino derivatives.

A large number of cross-linking or hardening agents for gelatins have already been described. Thus, there are known for instance, metal salts such as chromium, aluminum or zirconium salts, aldehydes or their derivatives, particularly formaldehyde, dialdehydes, mucochloric acid, diketones, quinones, as well as chlorides of 2-basic-organic acids, dianhydrides and in general, compounds having a plurality of reactive vinyl groups such as vinyl sulfones or acrylamides. There can also be used as hardening agents for gelatins, compounds which contain at least 2 readily splittable heterocyclic three-member rings such as ethylene oxide or ethylene imine. Polyfunctional methane sulfonic acid esters and bis-α-chloracylamido compounds have also already been described.

More recently, high molecular hardening agents such as polyacrolein and its derivatives or copolymers, as well as alginic acid derivatives have also been disclosed which are used, in particular, as layer-limited hardening agents.

Many of the said compounds can, however, not be used in particular for photographic purposes. Some are photographically active while others affect the physical properties such as the brittleness of the gelatin coatings in such detrimental fashion that they cannot be employed. Others again tend towards discoloration or to change the pH during the hardening reaction and finally it is particularly important for the photographic coatings that the hardening insofar as possible achieves its maximum only a short time after the drying-on so that the permeability for the developer solution does not continuously change as, for instance, in the case of mucochloric acid or formaldehyde.

In certain cases, cross-linking agents for gelatins such as the ethylene imine compounds, are also injurious to the skin, so that their use is not advisable for physiological reasons.

It has been known since a long time to use trichlorotriazine and dichloramino triazines as hardening agent. Their relatively high vapor pressure and physiological action constitute disadvantages. Water-soluble derivatives which contain carboxyl and sulfonic acid groups and which are obtained by reaction of cyanuric chloride with one mol of diamino alkyl or diamino aryl sulfonic acid or

2 carboxylic acid do not have these disadvantages and have recently been proposed as hardening agents. Their use in practice is, however, limited since due to their good solubility they decompose upon standing in aqueous solutions and thereby rapidly lose their effectiveness. Hydroxy-dichlorotriazine has also been proposed as hardening agent. Finally, it is of great importance in the case of a hardening agent for photographic gelatin-containing coatings, both for reasons of manufacture and for reasons of processing, that the starting of the cross-linking reaction can also be determined within certain limits, for instance by selection of the drying temperature or by selection of the pH.

The object of the present invention is to develop hardening agents for photographic gelatin coatings which are physiologically unobjectionable and by means of which the final condition of hardness is reached in a relatively short time.

It has now been found that non-ionic dichlorotriazinyl amino compounds which contain hydroxyl, ether or ester groups are excellently suitable as hardening agents for gelatin coatings used as photographic materials. The dichloretriazinyl amino radical can be present one or more times in the molecule. In addition to reaction products of 1 mol of cyanuric chloride with 1 mol of amino sugars, amino sugar ethers or amino polyalcohols, there have proven particularly suitable compounds of the formula:

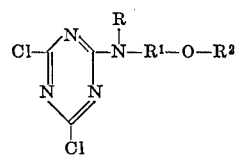

in which

R=H, alkyl with preferably up to 5 C atoms such as methyl, ethyl or propyl which may be substituted for instance with hydroxyl or alkoxy;

R¹=arylene and particularly phenylene, alkylene having preferably up to 5 C atoms in which connection the alkylene chain may be interrupted by hetero atoms, particularly nitrogen, and the alkylene chain can furthermore be substituted for instance with hydroxyl, alkoxy or hydroxyl which is esterified with aliphatic or aromatic carboxylic or sulfonic acids, aliphatic carboxylic acids having up to 6 C atoms being preferred;

R²=H, alkyl having preferably up to 5 C atoms such as methyl, ethyl or propyl, acyl including acyl groups which are derived from carbonic acid or carbauric acid or the grouping

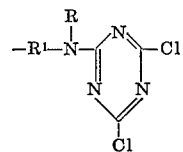

in which R and R¹ have the meaning indicated above.

The following compounds are particularly effective. They are merely indicated by way of example. However, they are not intended to limit the scope of the invention.

Compound 1:

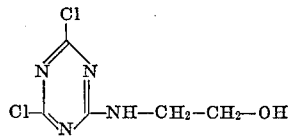

Melting point 110° C.

Compound 2:

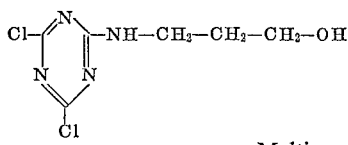

Melting point 85° C.

Compound 3:

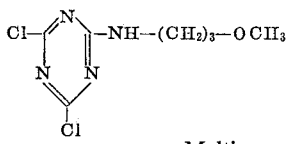

Melting point 72–73° C.

Compound 4:

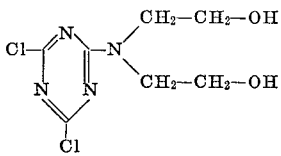

Melting point 138–140° C.

Compound 5:

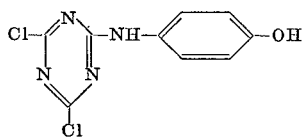

Compound 6:

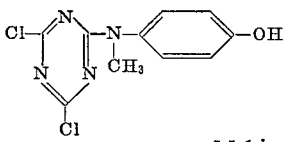

Melting point 78° C.

Compound 7:

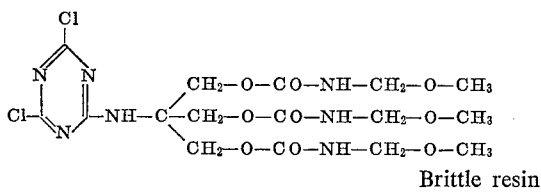

Brittle resin

Compound 8:

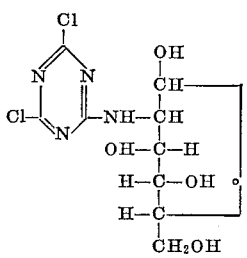

Decomposition point 210° C.

Compound 9:

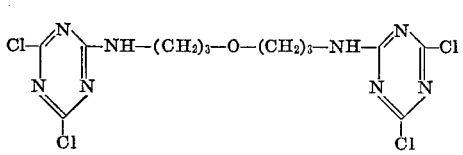

Melting point 115–117° C.

Compound 10:

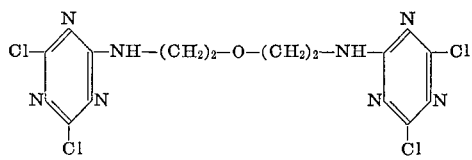

Melting point 165–166° C.

Compound 11:

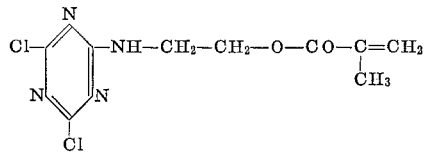

Melting point 121° C.

Most of the compounds can be readily prepared by reacting one mol of cyanuric chloride with one mol of the amine-containing hydroxyl, ether or ester groups in aqueous solution of 0 to 5° C. The manufacture will be described by the following example:

Production of N,N bis (hydroxyl ethyl) amino-dichlorotriazine:

36.8 g. (⅕ mol) of cyanuric chloride were dissolved in 200 cc. of acetone and this solution then stirred with strong agitation into 500 cc. of ice water. Within the course of half an hour there was then added drop by drop into the mixture with agitation, a solution of 21 g. (⅕ mol) of diethanolamine in 50 cc. of water (0 to 5° C.). Thereupon, a 10% sodium carbonate solution was added drop by drop in such a manner that the pH of the mixture was maintained at all times at 7. The reaction was complete when no further carbonate was consumed. The white product was removed by suction filtration and briefly washed then with cold water. It was recrystallized as rapidly as possible from 1:1 alcohol-water. After drying in a desiccator, the melting point was 138 to 140° C. Yield: 38 g.

All other compounds can be prepared in similar manner.

The compounds to be used in accordance with the method of the invention are generally soluble in acetone methanol or a mixture of water with organic solvents and are added preferably before the pouring to the gelatin coatings which are to be hardened. By photographic coatings there are understood in the present connection in general coatings which are used as photographic materials, for instance photo-sensitive silver halide coatings, protective coatings, filter coatings, anti-halation coatings, backing coatings, or in general, auxiliary photographic coatings. The action of the compounds to be used in accordance with the invention is not impaired by the customary photographic additions. Similarly, the hardening agents in accordance with the invention are inert to photographically active substances such as color components, stabilizers, sensitizers and the like. Furthermore, they do not exert any influence on the photosensitive silver halide emulsions.

The concentration of the hardening agents in accordance with the invention can vary within wide limits. It depends to a great extent on the nature of the hardening agent. The hardening reaction with the gelatin does not take place immediately but only upon the drying of the coating by simple standing or preferably by the action of higher temperatures of about 40 to 120° C.

The hardening agents in accordance with the invention can also be used in combination with known hardening agents such as formaldehyde, triacrylformal, divinyl sulfones such as dimethyl-bis (vinyl sulfonyl)-benzene, mucochloric acid or mucobromic acid. The melting point of the coatings is determined in the following manner:

The coating poured onto a substrate is dipped half in water which is continuously heated to 100° C. The temperature at which the coating runs off from the substrate (formation of streaks) is designated the melting point. The melting point of the coatings hardened in accordance with the method of the invention were determined in other tests after treatment for 5 minutes with a 5% aqueous soda solution immediately after the drying or after the above-indicated storage. In all of these tests it was found that the effectiveness of the hardening agents of the invention is not impaired. Under the conditions of the measurements, pure gelatin coatings without hardening agent in no case showed an increase in the melting point.

EXAMPLE 1

100 cc. of a 10% gelatin solution are brought to a pH of 6.2 and treated respectively with the following solutions of the hardening agents of the invention. The resultant mixture is poured onto a substrate of triacetyl cellulose provided with an adhesive layer. There is obtained a clear gelatin coating such as used in photographic materials as back layer or protective layer. The measurement of the melting point is effected in each case after storage for 36 hours at 56° C. and 40% relative humidity and after storage for 12 hours at room temperature. The gelatin solution was subjected in each case to 1%, 2% and 5% hardening agent (referred to the dry weight of the gelatin). The melting points are set forth in the following table:

| | Melting points of the layer in ° C. | | | | | |
|---|---|---|---|---|---|---|
| | Compound | | | | | |
| | Stored for 12 hours at 22° C. | | | Stored for 36 hours at 56° C. and 34% relative humidity | | |
| Quantity | 1% | 2% | 5% | 1% | 2% | 5% |
| Compound: | | | | | | |
| 1 | 30 | 30 | 30 | 40 | 50 | 100 |
| 2 | 30 | 100 | 100 | 100 | 100 | 100 |
| 3 | 30 | 30 | 50 | 50 | 100 | 100 |
| 4 | 30 | 30 | 60 | 40 | 100 | 100 |
| 9 | 30 | 30 | 30 | 100 | 100 | 100 |
| 8 | 30 | 80 | 100 | 70 | 100 | 100 |
| 7 | 30 | 30 | 70 | 80 | 80 | 100 |
| 10 | 30 | 30 | 30 | 100 | 100 | 100 |

In all of these tests it was found that the effectiveness of the hardening agents of the invention is very high.

EXAMPLE 2

To a liter of a silver chlorobromide emulsion which contains 80 g. of gelatin, there are added 120 ml. of a 1% aqueous alcoholic solution of Compound 10 (1.5% addition, referred to the gelatin dry weight) and the pH adjusted to 6.2. Furthermore, the solution, provided with the customary pouring additions, is poured onto a substrate of a polyester having a base of polyethylene terephthalate which is provided with an adhesive layer and then dried at room temperature. The melting points of the layer were:

(1) after 12 hours storage at room temperature: 30° C.
(2) after 36 hours storage at 56° C. and 34% relative moisture: above 100° C.
(3) after processing following the 36 hour storage of (2), i.e., after the use of a developer bath, a fixing bath and washing: 100° C.

The photographic properties of the layer were not changed thereby. No fog was produced.

EXAMPLE 3

To 400 ml. of a silver chlorobromide emulsion which contains 32 g. of gelatin, there are added 120 cc. of an 8% aqueous solution of the alkali salt of a coupler suitable for the chromogenic color development process, having the following formula:

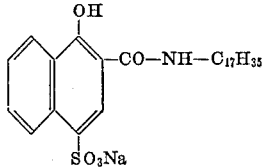

After addition of the customary pouring additives, there are furthermore added 250 ml. of water, the pH is adjusted to 6.2 and thereupon 32 ml. of a 1% aqueous solution of Compound 2 are added to the resultant solution. The finished pouring solution is poured onto an acetyl cellulose substrate provided with an adhesive layer.

The layers are dried at room temperature. The melting points of the layer obtained in this way were:

(1) after storage for 36 hours at room temperature: 60° C.
(2) after storage for 36 hours at 56° C. and 40% relative humidity: 100° C.
(3) after processing following the 36 hour storage of (2), i.e., after use of a color developer bath, a fixing bath, the bleaching bath and the washing: about 100° C.

The photographic properties of the layer remain unchanged. After the chromogenic processing, a blue-green color image is obtained.

EXAMPLE 4

To one liter of a silver chlorobromide emulsion containing 80 g. of gelatin which, in addition to the customary additives, contains a color coupler for chromogenic development, there are added 80 ml. and 400 ml. respectively, of a 1% aqueous-acetone solution of Compounds 1, 2, 9 and 10 as hardening agent. The mixture is poured onto baryta paper. The following melting points are obtained:

| | Fresh | After normal storage for 4 weeks | After 2 days at 60° C., 40% relative humidity |
|---|---|---|---|
| Compound 1: | | | |
| 0.8 g | 36° | 87° | 100°. |
| 4 g | 38° | 100° | 100°/1 min. |
| Compound 2: | | | |
| 0.8 g | 36° | 75° | 80°    80°. |
| 4 g | 36° | 75° | 90°. |
| Compound 10: | | | |
| 0.8 g | 36° | 100°/1 min.* | 100°/2 min. |
| 4 g | 37° | 100°/3 min | 100°/10 min. |
| Compound 9: | | | |
| 0.8 g | 37° | 100°/2 min | 100°. |
| 4 g | 38° | 100°/3 min | 100/13 min. |
| Hardening with triacrylformal 0.9 g./l. emulsion as comparison. | 35° | 100° | 100°. |

*100°/1 min. means: Layer dissolves after boiling for 1 minute.

The photographic properties were not impaired.

In addition to the melting point, the swelling of gelatin layers with hardening agent is an important criterion for the usefulness of the hardening agent. In order to measure the swelling, there can be used for example, the apparatus described on page 215 of Agfa-Mitteilungen Lverkusen-Munchen III (1961).

EXAMPLE 5

A 10% gelatin solution with or without addition of the substances in accordance with the invention are poured on a prepared acetyl cellulose film. The samples were stored for 72 hours at 35° C. and 85% relative humidity. Thereupon, the samples were dipped for 5 minutes in a metol-hydroquinone developer, subjected to an intermediate washing of 1 minute and treated in the fixing bath for 5 minutes. The swelling of the layer was measured every 60 seconds. The swelling factor consists of the thickness of the swollen layer divided by the thickness of the dry layer. The following values are obtained:

| Substance: | Swelling factor | | |
|---|---|---|---|
| | Developer | Water | Fixing bath |
| Without | 4.8 | 9.7 | 8.2 |
| 1 g | 3.5 | 6.0 | 4.6 |
| 2 g | 3.3 | 5.4 | 4.2 |
| 1 g | 3.3 | 6.1 | 4.5 |
| 2 g | 2.8 | 5.0 | 3.2 |
| 1 g | 3.4 | 5.6 | 4.3 |
| 2 g | 3.0 | 4.9 | 3.9 |

We claim:

1. Method of hardening a layer containing gelatin, comprising incorporating in the layer to be hardened, a hardening amount of a non-ionic dichlorotriazinyl amino compound in which the amino group is substituted by at least one organic radical containing a member selected from the group consisting of hydroxyl, ether and ester groups, and thereupon drying the layers.

2. Method according to claim 1, wherein said dichlorotriazinyl amino compound is selected from the group consisting of reaction products of cyanuric chloride with amino sugars of the general formula

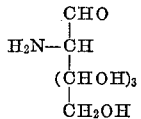

of cyanuric chloride with amino sugar ethers of the general formula:

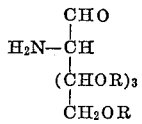

wherein R is selected from the group consisting of hydrogen, alkyl and aryl, such that at least one R is other than hydrogen, of cyanuric chloride with amino polyalcohols of the formula $NH_{3-x}(AOH)_x$ wherein A is an alkyline group of from 2 to 6 carbon atoms and $x$ is an integer of from 2 to 3, and compounds of the general formula

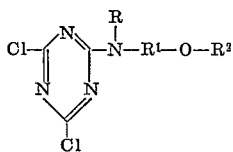

in which:

R is selected from the group consisting of hydrogen, alkyl, hydroxyl alkyl and alkoxy alkyl;

$R^1$ is selected from the group consisting of alkylene, alkylene chains interrupted by oxygen atoms;

$R^2$ is selected from the group consisting of hydrogen, alkyl and acyl groups and a group having the formula:

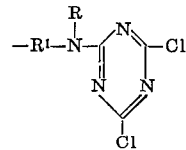

3. Method according to claim 1, wherein said compound is

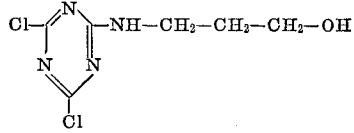

4. Method according to claim 1, wherein said compound is

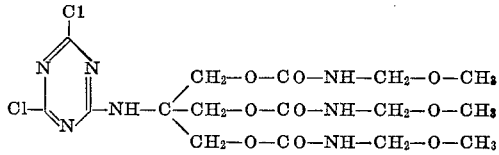

5. Method according to claim 1, wherein said compound is

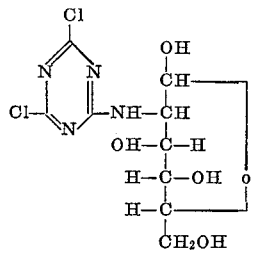

6. Method according to claim 1, wherein said compound is

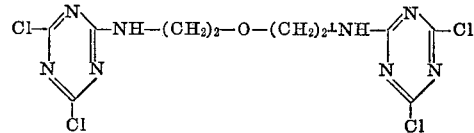

References Cited

UNITED STATES PATENTS 3,288,775  11/1966  Anderau et al. _____ 96—111

NORMAN G. TORCHIN, Primary Examiner

R. E. FICHTER, Assistant Examiner

U.S. Cl. X.R.

106—125; 260—117